(12) United States Patent
Schwab et al.

(10) Patent No.: US 7,279,039 B2
(45) Date of Patent: Oct. 9, 2007

(54) METHOD AND APPARATUS FOR CONTROLLING POLLUTION FROM A CEMENT PLANT

(75) Inventors: James J. Schwab, Napa, CA (US); Ronald L. Hawks, Raleigh, NC (US)

(73) Assignee: Envirocare International, Inc., American Canyon, CA (US)

( * ) Notice: Subject to any disclaimer, the term of this patent is extended or adjusted under 35 U.S.C. 154(b) by 115 days.

(21) Appl. No.: 11/026,481

(22) Filed: Dec. 30, 2004

(65) Prior Publication Data

US 2006/0144297 A1   Jul. 6, 2006

(51) Int. Cl.
*C04B 2/10* (2006.01)
(52) U.S. Cl. .................. 106/752; 106/761; 106/762
(58) Field of Classification Search ............. 106/752, 106/761, 762
See application file for complete search history.

(56) References Cited

U.S. PATENT DOCUMENTS

| | | | |
|---|---|---|---|
| 5,948,158 A * | 9/1999 | Fenger ................ | 106/739 |
| 6,691,628 B2 * | 2/2004 | Meyer et al. ........... | 110/345 |
| 7,048,784 B2 * | 5/2006 | Terasaki et al. .......... | 95/271 |
| 2006/0060112 A1 * | 3/2006 | Jensen et al. ........... | 106/693 |

FOREIGN PATENT DOCUMENTS

WO   WO87/04698   *   8/1987

OTHER PUBLICATIONS

Chemical Abstract # 93 of 113 (STN). WO 8704698, Aug. 1987, Kwech et al. see abstract.*
Chemical Abstract # 41 of 113 (STN) JP 2003103243 Apr. 2003, Takano et al.—see abstract.*
Chemical Abstract #288 of 379 (STN) JP 01011688, Jan. 1989, Shibata et al.—see abstract.*
Chemical Abstract # 200 of 379 (STN) JP 08089926, Apr. 1996, Murakami—see abstract.*
Chemical Abstract # 194 of 379 (STN) JP 08197095, Aug. 1996, Tanosaki et al.—see abstract.*

* cited by examiner

*Primary Examiner*—Paul Marcantoni

(57) ABSTRACT

A method and apparatus for reducing air pollutants associated with dry process, precalciner cement manufacturing is shown. Raw feed meal used in cement production is heated in a special heating chamber to drive off volatile compounds, such as organic materials and salts of ammonia. Preferably, the feed meal is heated to a temperature of at least 350° F. The gases that are driven off flow to the precalciner where they are combusted and rendered harmless. Heat is provided by diverting at least a portion of the exhaust gases from the cement pyroprocessing kiln to the special heater. The raw feed meal is indirectly heated using a heat exchange wall between the feed meal and the kiln exhaust gas flow. In addition, a base-containing material such as lime or precalcined feed meal, may be added to the raw feed before treatment meal to promote the breakdown of inorganic ammonium compounds, thereby releasing gaseous ammonia which is also destroyed upon subsequent combustion. Hot precalcined meal may also be used to provide some of the heat required to heat the raw feed meal in the special heating chamber.

22 Claims, 3 Drawing Sheets

METHOD AND APPARATUS FOR CONTROLLING POLLUTION FROM A CEMENT PLANT

FIELD OF THE INVENTION

The present invention relates to methods and apparatus for pollution control, and is particularly directed to controlling atmospheric emissions from cement plants.

BACKGROUND OF THE INVENTION

Over the past several decades air pollution control has been a priority concern of society. In the United States primary regulatory authority over industrial source air emissions resides in the U.S. Environmental Protection Agency ("EPA"). Over the years, the EPA has increased the stringency of its air pollution control programs, both by decreasing the limits on acceptable emissions and by continually increasing the number and types of regulated pollutants. The regulatory approach has been to force sources of air pollution to adopt the best available control technologies ("BACT"). In some instances, particularly where potentially toxic compounds are released into the atmosphere, sources are required to use the maximum available control technology ("MACT"). Thus, MACT must be used to control emissions of dioxins, furans and other substances regulated under the National Emission Standards for Hazardous Air Pollutants ("NESHAPS").

In many instances, the types of pollutants emitted from an industrial source and the technologies available to control the pollution are highly dependent on the specific industrial process in use. EPA is currently undertaking a review of emissions of various air pollutants, such as volatile organic compounds ("VOCs"), semivolatile compounds ("SCs"), ammonia ($NH_3$) and dioxins/furans, associated with various industrial processes, including the manufacturing of cement.

Control of pollution-created atmospheric haze is another element of EPA's air pollution regulatory program. Many areas of the U.S. have difficulty meeting regional haze limits, and EPA is investigating control strategies to achieve the regulatory goals. Ammonia emission is of concern in this respect because ammonia combines with nitric and sulfurous acid vapors to produce aerosols consisting of submicron salt particles which scatter light and reduce visibility. The ammonia-acid reactions may occur over time and at a great distance downwind from the point of release.

The foregoing problems are applicable to cement manufacturing facilities including those which use a precalciner prior to feeding the meal into the pyroprocessing kiln. A typical modem, prior-art cement manufacturing facility is shown in FIG. 1. While other dry and wet cement manufacturing processes are known, the dry, precalciner process depicted in FIG. 1 is now the most common and efficient.

The primary feed material, comprising a calcium-containing mineral used in manufacturing the cement, is obtained from a quarry, usually located nearby the cement plant. Typically the primary feed material is limestone, with smaller quantities of sand, clay, shale, and/or bauxite also being used. It has also become common to use industrial waste products, such as fly ash or slag, as feed materials. The feed materials provide the calcium, silica, aluminum and iron necessary to produce cement.

The quarried material is reduced in size by a crusher (not shown), and the crushed raw material is then transported to the cement plant, for example by motor or rail vehicle or by conveyor (also not shown). The proper proportions of the raw materials are then mixed and further reduced in size in a raw mill 10 to form a meal or feed material. For convenience the term "feed meal" is generally used herein to refer to the solid materials from the time they are processed in the raw mill to the time they enter the kiln. Thus, as used herein, feed meal includes the meal that has undergone precalcining.

The raw feed meal from raw mill 10 is then preheated in a preheating tower, comprising a series of vertically stacked cyclone chambers using exhaust gas from the kiln. While two such cyclone chambers (21, 22) are shown in FIG. 1, more (typically 3 or 4) may be used. Collectively these are referred to herein as the preheating tower and includes a precalciner 30. As depicted in FIG. 1, feed meal from raw mill 10 enters at the top of the preheating tower 21 and is preheated as it descends under the force of gravity.

The heated feed meal is then introduced into a precalciner 30, which converts the calcium carbonate ($CaCO_3$) in the limestone (or other feed material) into calcium oxide (CaO), releasing a large amount of carbon dioxide ($CO_2$) in the process. This is accomplished by heating the feed meal to high temperature—between about 1,650° F. (900° C.) and 1,800° F. (982° C.). The required temperature is higher than the temperature of the kiln exhaust gases, and so typically additional heat is generated in the precalciner by combustion of auxiliary fuel.

After precalcination the feed meal is introduced into a large rotary kiln 40 where it is heated to a temperature of about 2,700° F. (1,480° C.) to form "clinker," consisting primarily of calcium silicates. Rotary kiln 40, which may be as long as 700 feet (213 meters), is substantially horizontal, with a slight tilt sufficient for gravity-assisted transport of the materials undergoing pyroprocessing along its length. Various fuels may be used to support combustion within the kiln in order to achieve the high processing temperature that is required. The hot clinker is then discharged from the kiln into a cooling chamber 50. After being cooled, the clinker is discharged from cooling chamber 50 and ground into fine particles. Normally, a small amount of gypsum is added during this final process stage.

The air used for combustion in kiln 40 first flows through cooling chamber 50, where it gains heat as it cools the clinker. The hot exhaust gases from kiln 40 flow through the precalciner 30 and then to the preheating tower 21 as described. After combustion in the kiln very little oxygen remains in the exhaust gas flow, and so additional air is introduced into precalciner 30 to support combustion. After passing through preheating tower 21, the exhaust gases are routed through raw mill 10 used to grind the raw feed materials, before being discharged into the atmosphere via stack 60. Because of the high particulate load, a baghouse or electrostatic precipitator 70 is used to remove particles from the gas flow, which are typical recycled back into and blended with the feed meal.

In FIG. 1 the movement of the solids (i.e., the feed materials, clinker, etc.) between the various processing operations is shown by solid lines, while the flow of gases is shown with dashed lines. It can thus be seen that the gas flow through the process is generally counter to the flow of the solids and, from the time the gases leave the kiln to the time they are exhausted into the atmosphere, they exchange heat with the feed meal, i.e., the gases are cooled as the feed meal is dried and heated. Thus, for example, the feed meal is progressively heated as it travels down the preheating tower from one preheating cyclone to the next, while the flue gases become successively cooler as they travel up the tower.

The feed materials used in the cement manufacturing process are inherently impure and vary depending on locale. The impurities include a large variety of naturally occurring organic substances, metals, etc. In addition, the raw materials used in the process typically contain various acid forming compounds, including sulfates, chlorides, nitrates, etc. Emissions from prior art cement plants include particulates, nitrogen oxides ($NO_x$), sulfur dioxide ($SO_2$), sulfuric acid mist ($H_2SO_4$), carbon monoxide ($CO_2$), carbon dioxide ($CO_2$), ammonia ($NH_3$), hydrogen chloride (HCl), VOCs, SCs, metals, etc. As previously discussed, some of these emissions are considered hazardous and are subject to increasingly stringent regulatory controls. Unless proper controls are utilized, these may be released into the atmosphere during cement manufacturing.

The inventors have determined that a significant source of air pollutants from cement manufacturing is from the drying chambers used to reduce the moisture content of the feed meal prior to pyroprocessing in the kiln. As the feed meal is heated using the exhaust gases from the kiln, hydrocarbons with various boiling points fractionate, degrade and may be partially oxidized, such that the exhaust flue gases contain a range of aliphatic, aromatic and more complex organic species. These organic compounds in the exhaust are collectively referred to as either the total hydrocarbons (THC) or VOC, depending on the measurement technique used to quantify the emissions. The feed meal may also contain a mixture of organic and inorganic ammonium species that can decompose when heated to form HCl, sulfur trioxide ($SO_3$) and $NH_3$. Specific ammonium species may be released when heated by volatilization without decomposing, and these vapor phase emissions may condense to optically active submicron aerosols that scatter light, contributing to regional haze. Such species include, for example, ammonium chloride ($NH_4Cl$), ammonium sulfate (($NH_4)_2SO_4$), and ammonium bisulfate ($NH_4HSO_4$). Some of the problems associated with the presence of ammonia in the exhaust, and an approach to solving them, are discussed in the inventors' prior U.S. Pat. No. 6,060,030, the disclosure of which is incorporated by reference.

The inventors have determined that under certain conditions, HCl, chlorine ($Cl_2$) and aromatic hydrocarbons such as benzene, react to from dioxins and furans. The number of isomers that may be formed is complex, depending on the gas temperature, the cooling rate, and the relative concentration of reaction species. Presently, it is known to reduce dioxin and furan formation by controlling the cooling rate of the exhaust gases. This approach is marginally effective and unpredictable.

SUMMARY OF THE INVENTION

Accordingly, there is need for an improved apparatus and method of reducing air pollution from cement manufacturing and similar facilities which use feed materials that release pollutants when heated.

In one aspect, the present invention is directed to a method of reducing air pollution from a cement plant using a kiln for pyroprocessing, comprising the steps of mixing raw materials to form a feed meal, heating the feed meal to a temperature of at least about 350° F. to drive off volatile harmful compounds in the feed meal, and directing the volatile materials driven off from the feed meal into a combustion region wherein at least some of the volatile gases undergo reaction to substantially reduce the amount of harmful compounds. Preferably, the cement processing includes precalcining the feed meal, and the combustion region is the precalcining chamber. Alternatively, the combustion chamber may be the kiln itself or even a specially made combustion chamber. Preferably the feed meal is indirectly heated by hot exhaust gases from the kiln, and these exhaust gases may then be used in the precalciner, the preheating tower and the raw mill.

In another aspect, the present invention is directed to apparatus for reducing potentially harmful emissions from a rotary kiln, dry-process cement manufacturing plant, comprising an enclosed heating chamber for raising the temperature of feed meal used in the cement manufacturing, and a duct from said enclosed heating chamber to a combustion chamber, such that volatile compounds released from said feed meal are subjected to combustion. In addition, to receiving feed meal, the enclosed heating chamber may be configured to receive heated material from a precalciner, which is used to provide some of the heat used to raise the temperature of the feed meal.

In still another aspect, the present invention is directed to a method of removing pollutants from feed meal in a cement plant, comprising the steps of mixing raw feed meal with a material comprising a base which undergoes a base-base exchange reaction with at least one inorganic ammonium species in said feed meal, causing the release of gaseous ammonia, heating the mixture to a temperature sufficiently high to cause volatilization of a volatile organic species in said raw feed meal, combusting the gases released from said mixture after it has been heated.

DETAILED DESCRIPTION OF PREFERRED EMBODIMENT

Figure 1:
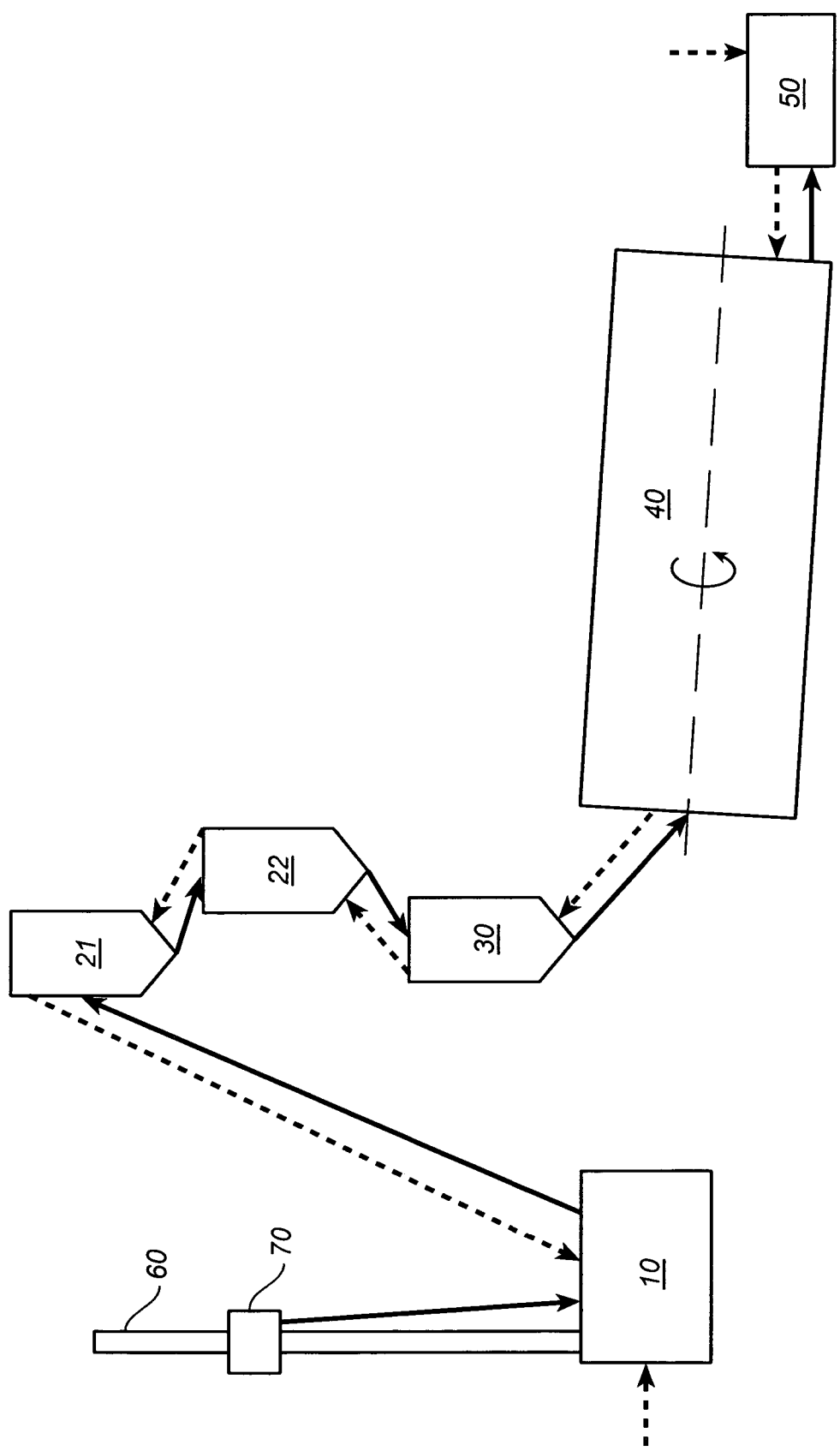
FIG. 1 is a schematic representation of a typical prior art dry-process, precalciner cement plant.

In accordance with prior art, dry-process cement manufacturing, as exemplified schematically in the previously described FIG. 1, exhaust gases from kiln 40 are used to preheat and dry the feed meal before pyroprocessing. As the feed meal is heated impurities and other substances are volatilized forming various types of gaseous and aerosol pollutants which become entrained in the exhaust gas flow, and which may be released into the atmosphere. Because in the prior art layout of a cement plant, as depicted in FIG. 1, the exhaust gas flow is counter to the process flow, the volatilized compounds are not further heated or broken down prior to release. The nature and extent of the pollutants released from a facility, such as that which is depicted in FIG. 1, depends not only on the nature and impurity content of the raw materials that go into the feed meal, but on the temperatures used in the preheating towers. Unfortunately, efforts to minimize the creation of certain types of pollutants generated in the preheating tower by attempting to carefully control the temperatures in the tower have proven to be largely ineffective.

Accordingly, pursuant to one aspect of the present invention the feed meal is heated in a separate chamber to drive off any volatile materials, using hot exhaust gas from the kiln. The gases that are driven off from the feed meal then flow to a combustion chamber where they are subjected to various types of combustion-induced reactions, rendering them relatively harmless. Thus, for example, harmful organic compounds may be oxidized to form water and carbon dioxide. Preferably and conveniently, the combustion chamber is the precalciner, and any additional harmful or undesirable species may be absorbed by the calcined meal.

Figure 2:
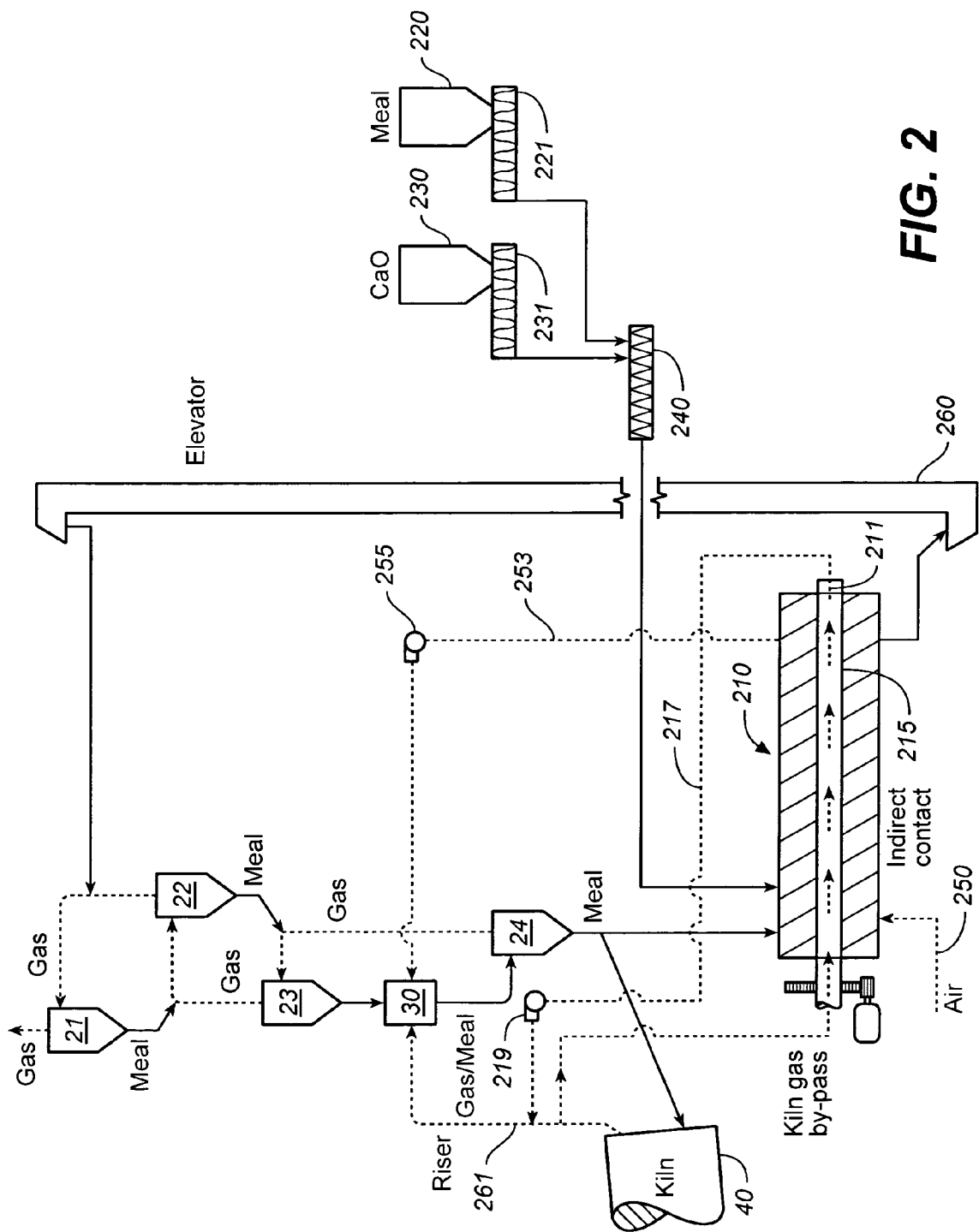
FIG. 2 is a partially schematic illustration of a dry-process, precalciner cement plant in accordance with the present invention.

FIG. 2 is a partially schematic illustration of a cement plant having pollution control apparatus according to an embodiment of the present invention. Again, the plant depicted is a dry-process, precalciner type facility, similar in many of its essential feature to the one depicted in FIG. 1, and the same reference numbers are used for the same elements. Raw feed meal from a raw mill (not shown) is transported to bin 220 and is introduced into a heater 210. Prior to being fed to the heater 210, the feed meal may be mixed with other materials, such as lime, to adjust the properties of the cement and to further reduce the release of pollutants as described below.

Figure 3:
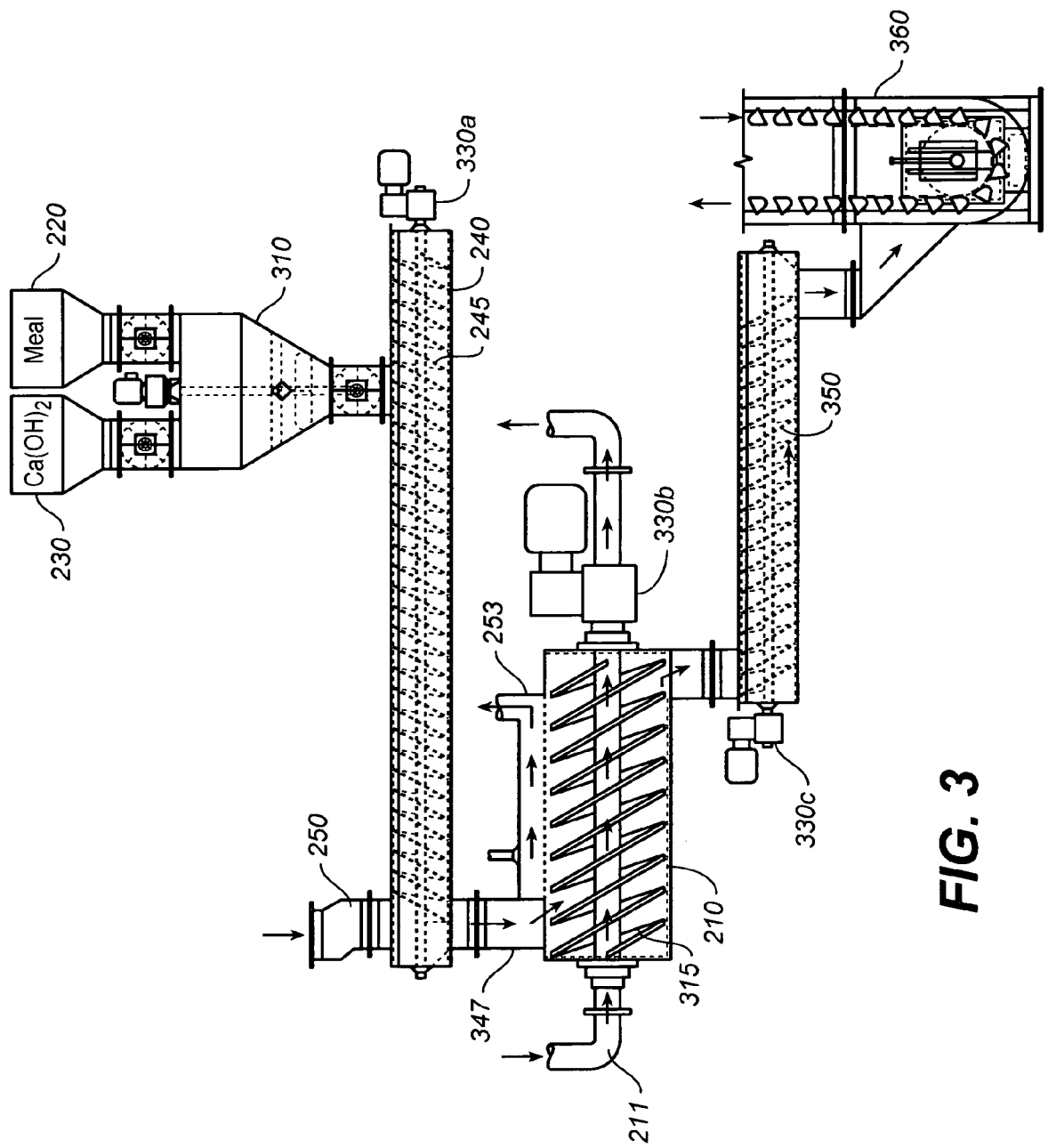
FIG. 3 is a partially schematic illustration of a feed meal treatment apparatus in accordance with one aspect of the present invention.

In FIG. 2, two screw transport mechanisms 221 and 231 are used to transport feed meal and lime (from bin 230), respectively, to mixer 240. The mixture is then transported to heater 210. A portion of the hot exhaust gases from kiln 40 is directed to heater 210. The gases flow through central duct 211 and are used to heat the feed meal mixture in heater 210. As depicted, heating is primarily accomplished indirectly, with the wall 215 of duct 211 serving as a heat exchange surface. Preferably, heater 210 comprises a screw or other transport mechanism to move the feed meal from one end of the heater to the other, as shown in FIG. 3. The screw also serves to further mix the feed meal so that it is uniformly heated.

Preferably, the feed meal enters heater 210 at a temperature which is relatively cool, i.e., lower than the temperature at which harmful compounds are volatilized, and is heated to a temperature sufficiently high to drive off the harmful volatile compounds of concern. Preferably, the temperature of the feed meal is raised to at least about 350° F. (177° C.) or more in heater 210.

According to the present invention, as in the prior art, after flowing through the heating tower, the exhaust flue gases from the kiln may be used to dry and heat the feed meal in the raw mill, so long as the temperature of the feed meal is not raised above the point at which harmful compounds are volatilized.

The feed meal may also contain inorganic ammonium species of sulfur and chlorides which are not easily volatilized. However, these species can be reduced in a "base-base exchange" when exposed to a relatively strong base such as CaO or $Ca(OH)_2$. According to an aspect of the present invention, a material containing CaO or $Ca(OH)_2$, such as lime or precalcined feed meal, is mixed with the raw feed meal prior to introduction into the heater to promote base-base exchange reactions. Thus, ammonium chloride ($NH_4Cl$) is converted to calcium chloride ($CaCl_2$), and ammonium sulfate (($NH_4)_2SO_4$) and ammonium bisulfite ($NH_4HSO_4$) are converted to calcium sulfate ($CaSO_4$) and calcium sulfite ($CaSO_3$), in each instance releasing gaseous ammonia. On the other hand, most organic ammonium species decompose by heating, again releasing gaseous ammonia. The gaseous ammonia, whether released directly from the breakdown of organic ammonium compounds or due to base-base exchange reactions are broken down into nitrogen and water by subsequent combustion, such that the ammonia is not released into the atmosphere.

After transiting heater 210, the heated feed meal exits and it then transported to the preheating tower 21 where it is further heated, as previously described. The feed meal then descends through heating towers 21 to precalciner 30 where it is precalcined, as previously described.

In accordance with a preferred method and apparatus of the present invention, the volatilized gases driven from the feed meal in heater 210 flow to precalciner 30, which acts as a combustion chamber. Air enters heater 210 by input duct 250. After circulating in the heater in contact with the feed meal, the air leaves via duct 253 which connects heater 210 to precalciner 30. The air, which carries the volatilized compounds driven off from the feed meal with it, is propelled by fan 255. If needed additional air can be added to the flow into the precalciner, depending on the needs of the precalciner combustion process. It can be appreciated that using a heater, according to the present invention, to volatilize and remove the hydrocarbon and other species of concern in feed meal prevents these substances from being released in the preheating tower.

A portion of the hot exhaust gases from kiln 40 also flows directly to precalciner 30 via duct 261. These gases have been substantially depleted of oxygen because of combustion with the kiln, such that an additional source of air is needed to provide oxygen to support combustion in precalciner 30. The air leaving heater 210 serves this function. Combustion of the volatilized gases in precalciner 30 causes various combustion reactions, depending on the substances, which substantially renders harmful pollutants relatively harmless.

As depicted in FIG. 2, after traveling through heater 210, the hot exhaust gases which are used to indirectly heat the feed meal are carried away in duct 217 propelled by fan 219. These gases are then recombined with the remaining kiln exhaust gas in duct 261 and flow to precalciner 30 and, thereafter, through the rest of preheating tower 23, 22, 21.

Also shown in FIG. 2 is an elevator 260 which is used to transport the feed meal from heater 210 to the preheating tower 21. In terms of physical layout, particularly for an apparatus of the present invention which is retrofitted into an existing cement plant, it is convenient to install heater 210 at a level which is below the top of the tower, requiring a transport mechanism to carry the heated feed meal to the top of tower 21. Thereafter, the feed meal flows through the plant in a conventional manner except, as noted, a relatively small portion may be diverted from the final cyclone 24 back to heater 210 where it helps heat the raw feed meal and promotes base-base exchange reactions.

FIG. 3 illustrates the heater and related equipment of an embodiment of the present invention in greater detail. Those components which are the same as in FIG. 2 are given the same reference numbers. Thus, FIG. 3 shows a mixer 240 which combines raw feed meal the raw mill (not shown in FIG. 3) in bin 220 with lime in bin 230. The feed meal is transported and mixed in mixer 240 by screw drive 245, which is driven by motor 330a. Upon reaching the end of mixer 240, the feed meal drops into heater 210 via chute 347. Air enters chute 347 from input duct 250, and begins mixing with the feed meal. Screw 315, driven by motor 330b, transports the feed meal through heater where it is indirectly heated by hot exhaust gases from the kiln, as previously described. Volatile gases released from the feed meal as it is heated exit heater 210 via duct 253 and are routed to a combustion chamber, preferably the precalciner. Upon reaching the end of heater 210, the heated feed meal drops into screw transport 350, driven by motor 330c, and carried to bucket elevator 360 which raises it to the top of the preheating tower. While a bucket elevator is shown, other transport mechanisms may be used, including, for example, a conveyor or a screw.

As can be appreciated from the foregoing, cement plants are advantageously designed for maximum efficiency to make optimal use of thermal energy. Gases are routed through the plant so as to use and recapture as much of the heat as possible. Implementation of the present invention does not appreciably affect the overall heat balance of the cement plant. Substantially all of the heat extracted from the kiln exhaust gases in heater 210 goes into either the meal or the air which flows from heater 210 to precalciner 30. In either case, the heat is retained in the process and is advantageously used. Thus, the preheated meal enters tower 21 at a temperature which is higher than if the meal were to be sent to the tower directly from the raw mill, and the air used for combustion in the precalciner is, likewise, hotter than if it were simply drawn into the combustion chamber externally. Accordingly, those skilled in the art will appreciate the desirability of optimizing the physical layout to minimize heat losses as the materials travel between the various processing stations in the system.

While preferred embodiments have been shown and described, various modifications and substitutions may be made thereto without departing from the spirit and scope of the invention. For example, while in the preferred embodiment the volatile materials from the heater are combusted in the precalciner, a specially designed combustion chamber may be used, or the volatile materials may be, instead, combusted by reintroduction into the kiln. Likewise, while the preferred embodiment show use of CaO or Ca(OH)$_2$ for the base-base exchange reaction, other base materials compatible with cement manufacturing may be used instead. Accordingly, it is to be understood that the present invention has been described by way of illustration only, and such illustrations and embodiments as have been disclosed herein are not to be construed as limiting to the claims.

We claim:

1. A method of reducing air pollution from a cement plant using a kiln for pyroprocessing, comprising:
    mixing raw materials to form a feed meal,
    preprocessing the feed meal without direct contact by exhaust gases from the kiln, wherein the preprocessing comprises the steps of:
    heating the feed meal to a temperature of at least about 350° F. to drive off volatile polluting compounds in the feed meal, and
    directing the volatile polluting compounds driven off from the feed meal into a combustion region wherein at least some of the volatile polluting compounds undergo reaction to substantially reduce the amount of polluting compounds.

2. The method of claim 1 further comprising the step of precalcining the feed meal in a precalciner chamber.

3. The method of claim 2 wherein said combustion region is in said precalciner chamber.

4. A method of reducing air pollution from a cement plant using a kiln for pyroprocessing, comprising:
    mixing raw materials to form a feed meal,
    preprocessing the feed meal, wherein the preprocessing comprises the steps of:
    indirectly heating the feed meal using exhaust gas from the cement kiln to a temperature of at least about 350° F. to drive off volatile polluting compounds in the feed meal, and
    directing the volatile polluting compounds driven off from the feed meal into a combustion region wherein at least some of the volatile polluting compounds undergo reaction to substantially reduce the amount of polluting compounds.

5. The method of claim 1 wherein said cement plant employs a preheating tower and wherein said feed meal is introduced into said preheating tower after being heated to drive off said volatile polluting compounds.

6. The method of claim 1 wherein said combustion region is within said kiln.

7. The method of claim 1 wherein said step of heating the feed meal is performed in a separate enclosed chamber.

8. The method of claim 7 wherein heated precalcined meal is mixed with raw feed meal in said chamber, and wherein said heated precalcined meal contributes to the heating of said feed meal and helps break down inorganic ammonium compounds in the feed meal.

9. The method of claim 1 wherein said reaction comprises oxidization, decomposition or combination.

10. The method of claim 1 wherein said polluting compounds comprises dioxins, furans, ammonia or acid-forming compounds.

11. The method of claim 1 wherein calcium oxide or calcium hydroxide is added to the feed meal prior to the step of heating to promote breakdown of inorganic ammonium compounds in the feed meal.

12. A method of removing pollutants from feed meal in a cement plant, comprising the steps of:
    mixing raw feed meal with a material comprising a base which undergoes a base-base exchange reaction with at least one inorganic ammonium species in said feed meal, thereby releasing gaseous ammonia,
    preprocessing the feed meal mixture without direct contact by exhaust gases, wherein the preprocessing comprises the steps of:
    heating the mixture to a temperature sufficiently high to cause volatilization of a volatile organic species in said raw feed meal,
    combusting the gases released from said mixture after it has been heated.

13. The method of claim 12 wherein said material comprising a base is lime.

14. The method of claim 12 wherein said material comprising a base is precalcined feed meal.

15. The method of claim 12 wherein said material comprising a base contains calcium hydroxide.

16. The method of claim 12 wherein said material comprising a base contains calcium oxide.

17. The method of claim 14 wherein said precalcined feed meal provides at least a portion of the heat used for heating the mixture.

18. The method of claim 17 wherein additional heat is provided by exhaust gases from a cement pyroprocessing kiln.

19. The method of claim 12 wherein said step of heating is performed in an enclosed heating chamber.

20. The method of claim 19 wherein said enclosed heating chamber comprises a heat exchange surface positioned between said mixture and a duct carrying hot exhaust gases from a cement pyroprocessing kiln, such that heat from the hot exhaust gases indirectly heats the mixture.

21. The method of claim 12 wherein said step of combusting is performed in a precalcining chamber used in cement processing.

22. The method of claim 12 wherein said mixture is heated to a temperature of at least 350° F.

* * * * *